US012607276B2

(12) United States Patent
Larsen

(10) Patent No.: US 12,607,276 B2
(45) Date of Patent: Apr. 21, 2026

(54) STEPPER MOTOR VALVE, COIL ASSEMBLY HOUSING, VALVE HOUSE ASSEMBLY AND VALVE BLOCK FOR THE STEPPER MOTOR VALVE

(71) Applicant: Danfoss A/S, Nordborg (DK)

(72) Inventor: Sigurd Larsen, Kruså (DK)

(73) Assignee: DANFOSS A/S, Nordborg (DK)

( * ) Notice: Subject to any disclaimer, the term of this patent is extended or adjusted under 35 U.S.C. 154(b) by 172 days.

(21) Appl. No.: 18/555,658

(22) PCT Filed: Feb. 11, 2022

(86) PCT No.: PCT/EP2022/053421
§ 371 (c)(1),
(2) Date: Oct. 16, 2023

(87) PCT Pub. No.: WO2022/223167
PCT Pub. Date: Oct. 27, 2022

(65) Prior Publication Data
US 2024/0209954 A1 Jun. 27, 2024

(30) Foreign Application Priority Data
Apr. 20, 2021 (DK) .............................. PA202100393

(51) Int. Cl.
*F16K 31/04* (2006.01)
*F16K 27/00* (2006.01)

(52) U.S. Cl.
CPC .............. *F16K 31/04* (2013.01); *F16K 27/00* (2013.01)

(58) Field of Classification Search
CPC ................................. F16K 31/04; F16K 27/00
See application file for complete search history.

(56) References Cited

U.S. PATENT DOCUMENTS

| | | | |
|---|---|---|---|
| 6,367,434 B1 | 4/2002 | Steigerwald et al. | |
| 9,074,699 B2 * | 7/2015 | Jamison | F16K 27/029 |
| 9,334,967 B2 | 5/2016 | Larsen et al. | |

(Continued)

FOREIGN PATENT DOCUMENTS

| | | |
|---|---|---|
| CN | 102135204 A | 7/2011 |
| CN | 102840372 B | 3/2016 |

(Continued)

OTHER PUBLICATIONS

Machine Translation CN102840372A (Year: 2016).*

(Continued)

*Primary Examiner* — Michael R Reid

(74) *Attorney, Agent, or Firm* — McCormick, Paulding & Huber PLLC

(57) ABSTRACT

A coil assembly housing for housing the actuator of a stepper motor valve includes a snap feature for snap fitting the coil assembly housing to a valve house assembly, wherein the snap feature includes at least one protrusion pointing radially inward of the coil assembly housing, wherein the protrusion is provided for interacting with a recess of the valve house assembly, and wherein the protrusion is held inside the recess by a wall of a valve block, into which the valve house assembly and the snap feature are insertable. The disclosure also pertains to a valve house assembly, a valve block and a stepper motor valve having such components.

2 Claims, 3 Drawing Sheets

(56) References Cited

U.S. PATENT DOCUMENTS

| | | |
|---|---|---|
| 10,344,884 B2 | 7/2019 | Harck et al. |
| 10,814,426 B2 | 10/2020 | Harck et al. |
| 11,680,658 B2 | 6/2023 | Harck et al. |
| 11,879,676 B2 | 1/2024 | Larsen et al. |
| 2020/0049294 A1 | 2/2020 | Rezaei et al. |
| 2022/0065507 A1 | 3/2022 | Larsen |
| 2023/0034594 A1 | 2/2023 | Rasmussen et al. |

FOREIGN PATENT DOCUMENTS

| | | |
|---|---|---|
| CN | 111561572 A | 8/2020 |
| CN | 216045721 U | 3/2022 |
| CN | 217519254 U | 9/2022 |
| DE | 102013111456 A1 | 4/2015 |
| DE | 102019107273 A1 | 9/2020 |
| EP | 2653758 A1 | 10/2013 |
| EP | 2986874 A1 | 2/2016 |
| EP | 3 585 138 A1 | 12/2019 |
| EP | 3671071 A1 | 6/2020 |
| EP | 3671072 A1 | 6/2020 |
| EP | 3671073 A1 | 6/2020 |
| EP | 3672030 A1 | 6/2020 |
| EP | 4302025 A1 | 1/2024 |
| JP | 2001032954 A | 2/2001 |
| JP | 2015010659 A | 1/2015 |
| WO | 0052373 A1 | 9/2000 |
| WO | 2011062944 A1 | 5/2011 |
| WO | 2014169916 A1 | 10/2014 |
| WO | 2020126203 A1 | 6/2020 |
| WO | 2022184288 A1 | 9/2022 |
| WO | 2022223167 A1 | 10/2022 |
| WO | 2023151858 A1 | 8/2023 |

OTHER PUBLICATIONS

First Technical Examination for Danish Patent Application No. PA 2021 00393, dated Oct. 20, 2021.

International Search Report mailed Jun. 7, 2022, in connection with corresponding International Application No. PCT/EP2022/053421; 4 pages.

* cited by examiner

1

2

3

13
12

16

21

32

31

1

2

3

16

14

1

3

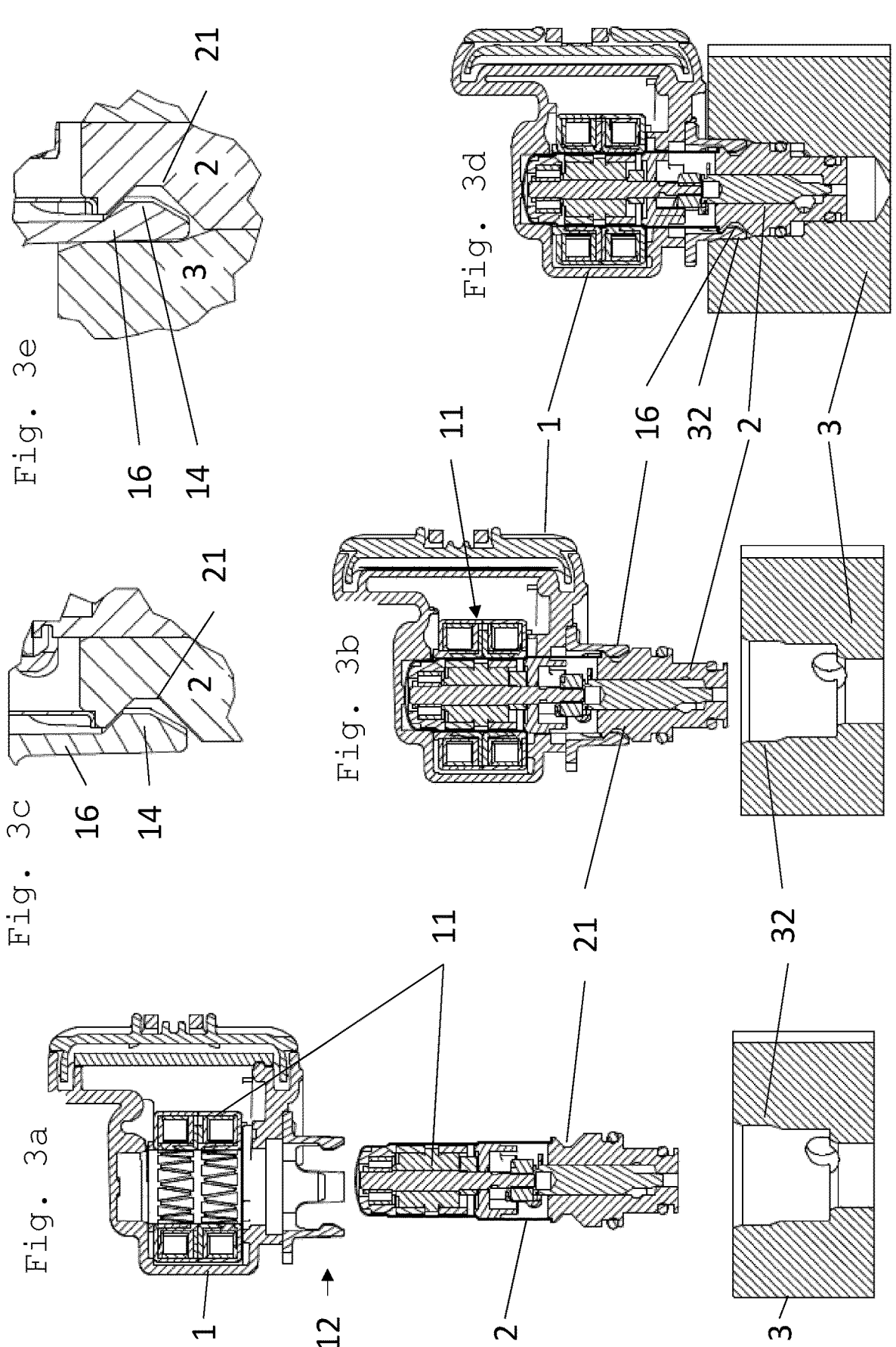

STEPPER MOTOR VALVE, COIL ASSEMBLY HOUSING, VALVE HOUSE ASSEMBLY AND VALVE BLOCK FOR THE STEPPER MOTOR VALVE

CROSS-REFERENCE TO RELATED APPLICATIONS

This application is a National Stage application of International Patent Application No. PCT/EP2022/053421, filed on Feb. 11, 2022, which claims priority to Danish Patent Application No. PA202100393, filed on Apr. 20, 2021, each of which is hereby incorporated by reference in its entirety.

TECHNICAL FIELD

The present invention pertains to a coil assembly housing for housing the actuator of a stepper motor valve, comprising a snap feature for snap fitting the coil assembly housing to a valve house assembly, wherein the snap feature comprises at least one protrusion pointing radially inward of the coil assembly housing, wherein the protrusion is provided for interacting with a recess of the valve house assembly, and wherein the protrusion is held inside the recess by a wall of a valve block, into which the valve house assembly and the snap feature are insertable. The invention also pertains to a valve house assembly, a valve block and a stepper motor valve comprising said components.

BACKGROUND

Stepper motor valves may comprise a number of subcomponents such as a valve house assembly, a valve block and/or a coil assembly housing which are arranged to form a given stepper motor valve. Drawbacks of known solutions may comprise the need for special fixation means such as bolts, which fix the components of the valve with respect to each other. In addition, the known designs of such valves may exhibit only limited freedom of choice or flexibility as to the angular position of the actuator with respect to other components of the valve.

SUMMARY

The aim of the present invention is to overcome these problems by providing improved stepper motor valve components and, consequently, an improved stepper motor valve. This aim is reached by coil assembly housing embodiments disclosed herein, valve house assembly embodiments disclosed herein, and valve block embodiments disclosed herein and stepper motor embodiments disclosed herein.

According to the invention, a coil assembly housing is provided for housing the actuator of a stepper motor valve. The coil assembly housing comprises a snap feature for snap fitting the coil assembly housing to a valve house assembly. The snap feature comprises at least one protrusion pointing radially inward of the coil assembly housing, wherein the protrusion is provided for interacting with a recess of the valve house assembly, and wherein the protrusion is held inside the recess by a wall of a valve block, into which the valve house assembly and the snap feature are insertable.

The recess may be understood to be a groove, a notch, or a shoulder and it may be arranged in a circumferential direction of the valve house assembly. The recess may be arranged in proximity to a portion of the valve house assembly which is closest to the coil assembly housing while at the same time being inside the valve block in an assembled state of the stepper motor valve. In particular, the recess may not be regarded as a bottom edge or bottom shoulder of the valve house assembly, arranged closest to the side of the valve house assembly, which is furthest from the coil assembly housing in an assembled state of the stepper motor valve.

The valve house assembly may be a valve component, which comprises fluid conduits and/or one more movable fluid control element for controlling the fluid flow across the stepper motor valve.

Directions such as the radial, circumferential and axial direction of the presently described components may be referenced to a cylindrical or partially cylindrical opening of the coil assembly housing, into which the valve house assembly is at least partially insertable. The valve house assembly and the valve block may comprise corresponding partially or fully cylindrical features, such that their radial, circumferential and axial directions may correspond to the radial, circumferential and axial directions of the coil assembly housing.

The present invention provides a simple possibility for fixing the actuator of a stepper motor valve to the remainder of the valve, such that unwanted relative movement of the components is inhibited. The actuator, or rather, the coil assembly housing, in which the actuator is provided, is fixated axially to the valve house assembly via a snapping arrangement. The valve house assembly is then inserted into a valve block whereby a mechanical locking of the coil assembly housing may take place.

In a preferred embodiment of the invention, the coil assembly housing comprises an anti-rotation feature for preventing rotation of the coil assembly housing with respect to the valve block, wherein the anti-rotation feature comprises an end portion or a recess pointing in an axial direction of the coil assembly housing. The end portion or recess points towards the valve block when the coil assembly housing is attached to it. This orientation of the end portion or the recess makes it possible to interlock at least partially both, the anti-rotation feature and the snap feature with the valve block simultaneously.

In another preferred embodiment of the invention, the snap feature is the outermost portion of the coil assembly housing in an axial direction of the coil assembly housing and/or the snap feature comprises at least two arms pointing in an axial direction of the coil assembly housing. The arms of the snap feature may be identical to each other. The arms may exhibit some sort of rotational symmetry with respect to each other.

In another preferred embodiment of the invention, the arms are arranged in a circumferential direction of the coil assembly housing. The arms may be spaced evenly in the circumferential direction for providing a balanced connection between the coil assembly housing and the valve house assembly.

In another preferred embodiment of the invention, the anti-rotation feature is positioned radially outward of the snap feature and/or the anti-rotation feature and the snap feature are formed integrally with each other and/or other parts of the coil assembly housing. The manufacture of the coil assembly housing may be facilitated considerably by integrating its various features in one or only a few integrally formed components.

The invention is also directed at a valve house assembly for a stepper motor valve, comprising at least one valve house assembly recess for interacting with the protrusion of coil assembly housing embodiments disclosed herein.

In a preferred embodiment of the invention, the valve house assembly recess is an annular groove along an outside cylindrical surface of the valve house assembly. The annular grove is easy to manufacture while at the same time making it possible to attach the valve house assembly to the coil assembly housing at any desired angle.

In another preferred embodiment of the invention, the outside of the valve house assembly is formed at least in partial rotational symmetry. The valve house assembly may thus be formed as a turned part.

The invention is also directed at a valve block for a stepper motor valve, wherein an interior cylindrical wall is provided for interacting with the snap feature of coil assembly housing embodiments disclosed herein. The interior cylindrical wall may be a bore and/or may be dimensioned to accommodate the snap feature such that the snap feature and the valve house assembly can be inserted simultaneously into the valve block in a state, in which the snap feature is snapped into the recess of the valve house assembly.

In a preferred embodiment of the invention, at least one valve block structure is provided for interacting with the anti-rotation feature of coil assembly housing embodiments disclosed herein. The valve block structure may be shaped to accommodate the anti-rotation feature such that rotational movement of the coil assembly housing with respect to the valve block is inhibited.

The invention is also directed at a stepper motor valve comprising coil assembly housing embodiments disclosed herein, valve house assembly embodiments disclosed herein and valve block embodiments disclosed herein, wherein the coil assembly housing is connected to the valve house assembly by means of the snap feature and the valve house assembly recess and wherein the snap feature is held in the valve house assembly recess by the valve block.

In a preferred embodiment of the invention, the anti-rotation feature of coil assembly housing embodiments disclosed herein interacts with the valve block structure of valve block embodiments disclosed herein for locking the coil assembly housing with respect to the valve block in a rotational direction.

BRIEF DESCRIPTION OF THE DRAWINGS

The presently described stepper motor valve and its components are shown in more detail in the figures and the corresponding description of the figures. The figures show:

FIGS. 3a-3e: various cross-sectional views of the assembly of the stepper motor valve.

DETAILED DESCRIPTION

Figures 1A, 1B, 1C:
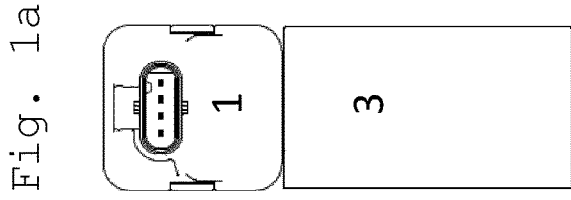
FIG. 1a: a side view of a stepper motor valve comprising a coil assembly housing and a valve block.
FIGS. 1b and 1c: exploded views of the stepper motor valve showing the coil assembly housing, the valve block and a valve house assembly.

FIG. 1a shows a side view of a stepper motor valve comprising a coil assembly housing 1 and a valve block 3. The coil assembly housing 1 may house an actuator 11 of the stepper motor valve and it may be attached to the valve block. The actuator 11 may be inside the coil assembly housing 1 and is shown in FIG. 3a. The coil assembly housing 1 may comprise some connection means for connecting the stepper motor valve to a power supply for supplying power to the actuator 11 and/or it may comprise connection means for connecting the stepper motor valve to some control means for controlling the actuator 11.

According to FIGS. 1b and 1c, the coil assembly housing 1 comprises a snap feature 12 for snap fitting the coil assembly housing 1 to a valve house assembly 2. The valve house assembly 2 may contain some valve element, which is moveable by the actuator 11 for switching the stepper motor valve between some open and closed positions of the valve. The snap feature 12 comprises some arms 16 and at least one protrusion 14 pointing radially inward of the coil assembly housing 1.

The snap feature 12 may be the outermost portion of the coil assembly housing 1 in an axial direction of the coil assembly housing 1, i.e. it may be the lowest portion of the coil assembly housing 1 as shown in FIG. 1b. The snap feature 12 may comprise at least two arms 16 pointing in an axial direction of the coil assembly housing 1. Said arms 16 may be arranged in a circumferential direction of the coil assembly housing 1. The axial, circumferential and radial directions may be defined with respect to an opening in the coil assembly housing 1, into which the valve house assembly 2 is insertable. This opening may be at least partially of cylindrical shape such that corresponding axial, circumferential and radial directions may be attributed to it.

When the snap feature 12 comprises multiple arms 16, each arm 16 may comprise one or more of said protrusions 14. In FIG. 1b, two arms 16 are visible and in FIG. 1c, three arms 16 are visible. The embodiments of FIGS. 1b and 1c may comprise a total of three, four or more arms 16.

The protrusion 14 is provided on the arm 16 for interacting with a recess 21 of the valve house assembly 2. The protrusion 14 and the recess 21 may be shaped such that the protrusion 14 can be inserted partially or fully into the recess 21 by pushing the valve house assembly 2 into the opening of the coil assembly housing 1. The valve house assembly recess 21 may be an annular groove along an outside cylindrical surface of the valve house assembly 2. The outside of the valve house assembly 2 may be formed at least in partial rotational symmetry. The opening of the coil assembly housing 1 may be arranged between the arms 16, such that the arms 16 may surround the valve house assembly 2 once the valve house assembly 2 has been inserted into the opening.

The valve house assembly 2 may comprise an upper part and a lower part. The upper part may comprise some components of the actuator 11, such as the rotor or the stator. The lower part may comprise a valve housing with at least one fluid control edge and/or fluid conduit. The recess 21 may be positioned close to a portion of the valve house assembly 2 at which the upper and lower part of the valve house assembly 2 are joined.

In a state in which the valve house assembly 2 is inserted in the coil assembly housing 1, both, the valve house assembly 2 and the coil assembly housing 1 may be inserted at least partially into the valve block 3. Then, the protrusion 14 is held inside the recess 21 by a wall 32 of the valve block 3. The wall 32 may be a cylindrical wall 32 of a bore within the valve block 3, wherein the bore is provided for accommodating at least some parts of the valve house assembly 2 and the coil assembly housing 1.

The coil assembly housing 1 may comprise an anti-rotation feature 13 for preventing rotation of the coil assembly housing 1 with respect to the valve block 3. The anti-rotation feature 13 may interact with at least one valve block structure 31 in an assembled state of the stepper motor valve. The valve block structure 31 may be dimensioned for accommodating the anti-rotation feature 13, or vice versa, and may be provided adjacent to the wall 32 of the bore in the valve block 3.

More than one valve block structure 31 may be provided in the valve block 3, wherein the plurality of valve block structures 31 may be arranged in a circumferential direction with respect to the bore of the valve block 3. The anti-rotation feature 13 may interact with any of the valve block structures 31 such that the coil assembly housing 1 may be oriented at various angles with respect to the valve block 3.

The anti-rotation feature 13 may be positioned radially outward of the snap feature 12. The anti-rotation feature 13 and the snap feature 12 may be formed integrally with each other and/or the remainder of the coil assembly housing 1 or some other portion of the coil assembly housing 1.

FIGS. 2a-2d show various views of the assembled stepper motor valve. According to FIG. 2a, the valve block structure 31 may be provided at a side of the valve block 3, at which one or more openings are provided for allowing a fluid connection between the inside and the outside of the valve block 3.

Figures 2A, 2B, 2C, 2D:
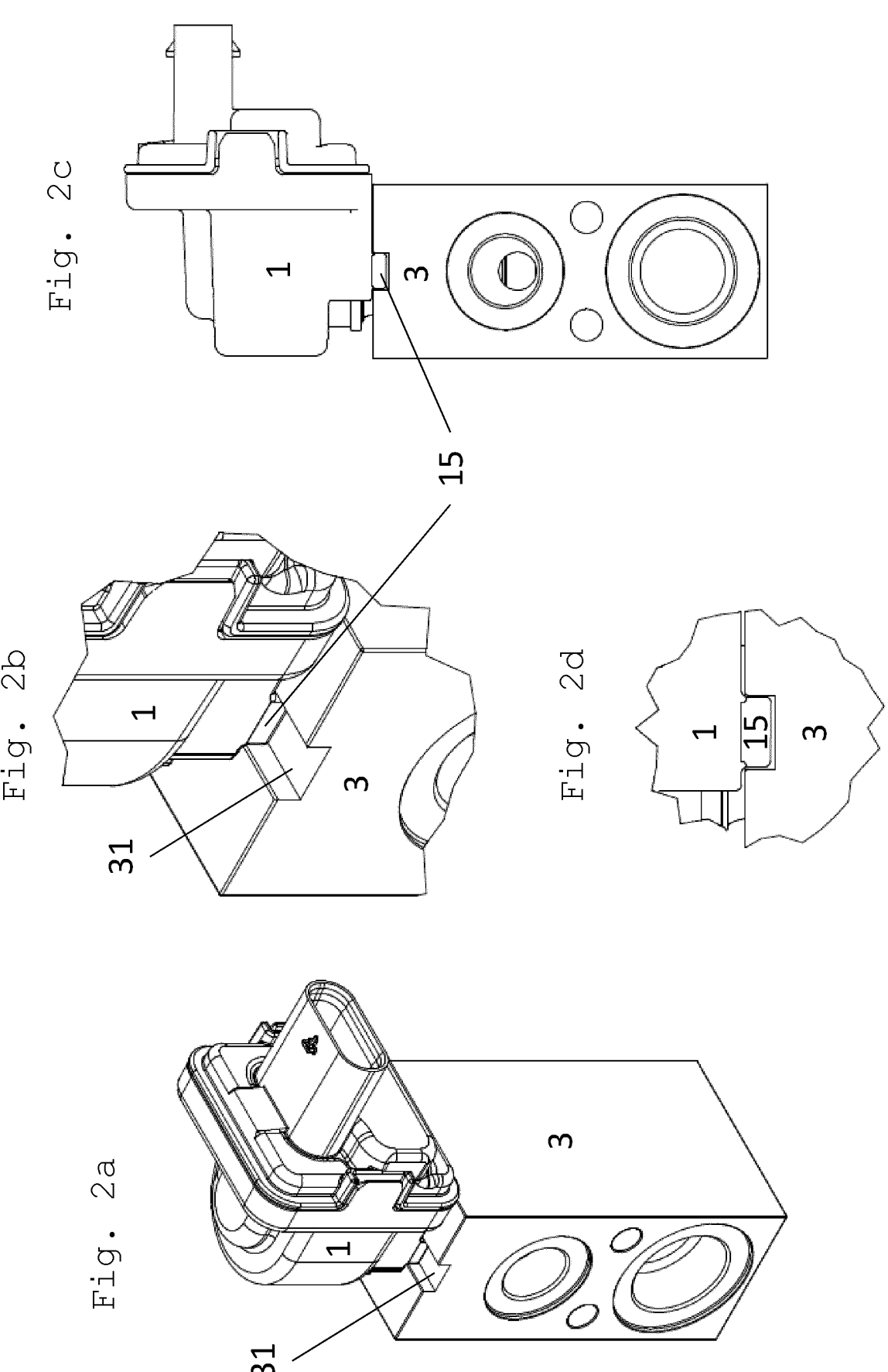
FIGS. 2a-2d: various views of the assembled stepper motor valve.

FIGS. 2b-2d show the end portion 15 of the anti-rotation feature 13 pointing in an axial direction of the coil assembly housing 1 and reaching into the valve block structure 31. The end portion 15 sits inside the valve block structure 31 such that relative rotation of the valve block 3 and the coil assembly housing 1 is inhibited. It is conceivable to provide an in-verted, i.e. recessed anti-rotation feature 13, whereby the valve block structure 31 is made of some protrusion at the valve block 3 and is positioned at least partially in the recessed anti-rotation feature 13 of the coil assembly housing 1 for inhibiting rotational movement of the coil assembly housing 1 and the valve block 3.

FIGS. 3a to 3e show that the stepper motor valve comprises a number of components, which interact with each other when assembled to form the complete stepper motor valve:

According to FIGS. 3a and 3b, the coil assembly housing 1 accommodates the valve house assembly 2 such that the actuator 11 can adjust the position of a valve element provided at the valve house assembly 2 and the snap feature 12 may engage the recess 21 for creating a connection between the valve house assembly 2 and the coil assembly housing 1. The actuator 11 may comprise a rotor and a stator, wherein the rotor may be insertable into the stator. In the situation shown in FIG. 3a, the stator and rotor are shown separate from each other, whereas FIGS. 3b and 3d show the rotor and stator in a situation in which the actuator is readily assembled. The rotor may be insertable into the stator or vice versa.

The connection between the valve house assembly 2 and the coil assembly housing 1 is shown in more detail in FIG. 3c, where the protrusion 14 of the snap feature 12 is shown in engagement with the recess 21 of the valve house assembly 2. The recess 21 may be slightly larger than the protrusion 14 such that it can accommodated the protrusion 14. When the protrusion 14 is engaging the recess 21, the arm 16 of the snap feature 12 may extend radially further outward than the valve house assembly 2. In addition, the arm 16 may be formed to be under no stress in a state in which the protrusion 14 is inserted in the recess 21.

Once the valve house assembly 2 and the coil assembly housing 1 are connected as shown in FIGS. 3b and 3c, they may be inserted into the bore of the valve block 3. The inserted valve house assembly 2 and coil assembly housing 1 are shown in FIGS. 3d and 3e. The bore in the valve block 3 is bound by the wall 32. The wall 32 may comprise two or more distinct portions of e.g. different diameters. An upper portion of the wall 32 may have a larger diameter than a lower portion of the wall 32. The upper portion may be dimensioned to accommodate the arms 16 of the snap feature 12 and/or to press the arms 16 against the valve house assembly 2 when both, the valve house assembly 2 and the arms 16 of the snap feature 12 are inserted in the valve block 3 as shown in FIGS. 3d and 3e.

Once the valve house assembly 2 and the arms 16 of the snap feature 12 are inserted together into the valve block 3, the wall 32 keeps the protrusions 14 of the arms 16 inside the recess 21.

A lower portion of the wall 32 may have a smaller diameter such that it may be close to or in contact with an outside wall of the valve house assembly 2. The upper portion of the wall 32 may extend at least as far as the arms 16 reach inside the valve block 3. Additional wall portions may be provided lower down along the valve block 3 and may be of further reduced diameters for accommodating other portions of the valve house assembly 2.

FIG. 3d shows an assembled stepper motor valve comprising the coil assembly housing 1, the valve house assembly 2 and the valve block 3. These three components may all interact with each other to be fixedly positioned with respect to each other, wherein the coil assembly housing 1 is connected to the valve house assembly 2 by means of the snap feature 12 and the valve house assembly recess 21 and wherein the snap feature 12 is held in the valve house assembly recess 21 by the wall 32 of the valve block 3. Alternatively, the stepper motor valve may be understood to comprise only the coil assembly housing 1 and the valve house assembly 2, such that it may or may not be inserted into a valve block 3 at some later stage. All or some of the components of the stepper motor valve may be made of e.g. aluminium or some other suitable material.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A stepper motor valve, comprising:
   a coil assembly housing for housing an actuator of the stepper motor valve, the coil assembly housing comprising a snap feature for snap fitting the coil assembly housing to a valve house assembly, wherein the snap feature comprises at least one protrusion pointing radially inward of the coil assembly housing, wherein the protrusion is provided for interacting with a recess of the valve house assembly, and wherein the protrusion is held inside the recess by a wall of a valve block, into which the valve house assembly and the snap feature are insertable, and
   the valve house assembly comprising at least one valve house assembly recess for interacting with the protrusion of the coil assembly housing, and a valve block wherein an interior cylindrical wall is provided for interacting with the snap feature of the coil assembly housing, wherein the coil assembly housing is connected to the valve house assembly by means of the snap feature and the valve house assembly recess and wherein the snap feature is held in the valve house assembly recess by the valve block.

2. The stepper motor valve according to claim 1, wherein an anti-rotation feature of the coil assembly housing comprising an anti-rotation feature for preventing rotation of the coil assembly housing with respect to the valve block, wherein the anti-rotation feature comprises an end portion or a recess pointing in an axial direction of the coil assembly housing, interacts with the valve block structure of the valve block wherein at least one valve block structure is provided for interacting with the anti-rotation feature of the coil assembly housing for locking the coil assembly housing with respect to the valve block in a rotational direction.

\* \* \* \* \*